CIRCUIT ARRANGEMENT FOR PRODUCING THE SUM AND
DIFFERENCE OF TWO LOW-FREQUENCY SIGNALS
Filed Nov. 14, 1960

INVENTORS
FRANS L. H. M. STUMPERS
RUDOLF SCHUTTE
BY
Frank R. Jifan
AGENT

United States Patent Office 3,123,779
Patented Mar. 3, 1964

3,123,779

CIRCUIT ARRANGEMENT FOR PRODUCING THE SUM AND DIFFERENCE OF TWO LOW-FREQUENCY SIGNALS

Frans Louis Henri Marie Stumpers and Rudolf Schutte, Eindhoven, Netherlands, assignors to North American Philips Company, Inc., New York, N.Y., a corporation of Delaware Filed Nov. 14, 1960, Ser. No. 68,851
Claims priority, application Netherlands Dec. 21, 1959
7 Claims. (Cl. 330—69)

The invention relates to a circuit arrangement for producing the sum and difference of two low-frequency signals A and B, particularly for stereophonic transmission, for example, for use in stereophonic transmitters and stereophonic receivers; the low-frequency signal A is fed to a first follower amplifier and the low-frequency signal B is fed to a second follower amplifier, the amplifiers having at least partly common output circuits, while the sum signal $A+B$ is derived from a center tap of a voltage divider connected between the output circuits of the two follower amplifiers. The sum and difference producer according to the invention may be equipped with tubes or transistors; the term "follower amplifiers" having an at least partly common output circuit is to be understood to mean, as is known, a grounded plate amplifier in the case of tube equipment and a common-collector amplifier in transistor equipment.

Such sum and difference producers are subject to very precise performance requirements particularly in stereophony, especially with respect to the phase displacements introduced by the sum and difference producers between the sum signal and the difference signal, since these phase displacements give rise to cross-talk.

The invention has for its object to provide a device of the kind set forth, in which there is obtained not only a great degree of independence of the properties of the tubes or transistors but also a minimization of phase shifts occurring in the sum-difference-formation are minimized.

The device according to the invention is characterized in that in order to form the difference signal $A-B$, a third follower amplifier is provided having an output circuit at least partly common to those of the other amplifiers, the output circuit of the third follower amplifier being connected via an individual voltage divider to the output circuits of the first and second follower amplifiers; the input voltage of the third follower amplifier is obtained from the output circuit of a voltage amplifier whose input circuit is connected to a center tap of one of the voltage dividers connected to the output circuit of the third follower amplifier; the difference signal $A-B$ is derived from a center tap of the other voltage divider connected to the output circuit of the third follower amplifier.

The invention and its advantages will now be described more fully with reference to the drawings.

Figure 1:
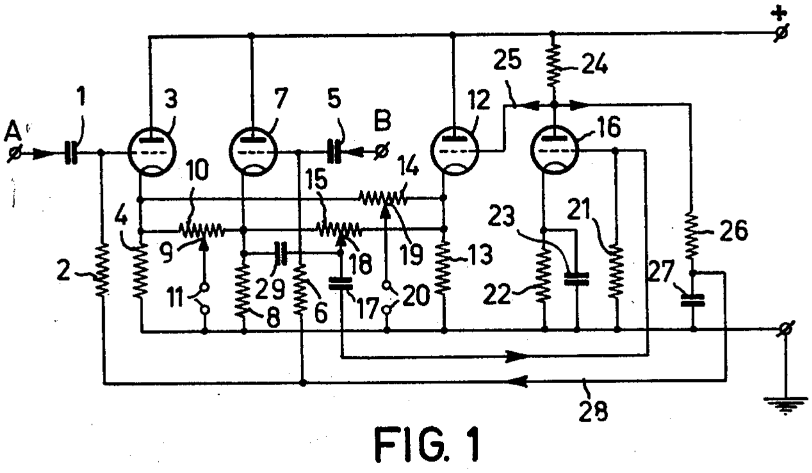
Figure 2:
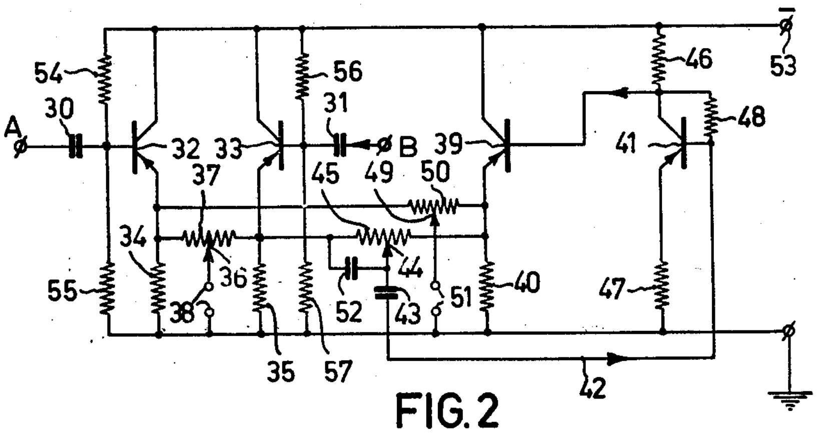

FIG. 1 shows a tube-equipped sum and difference producer according to the invention and FIG. 2 shows a transistorized sum and difference producer according to the invention.

The device according to the invention shown in FIG. 1 comprising a tube-equipped sum and difference producer may form part of a stereophonic transmitter suitable for the transmission of stereophonic signals in the band from 30 c./s. to 15,000 c./s. The inventive concept, however, is not limited to this particular band.

In FIG. 1 the low-frequency signal A is fed via a separation capacitor 1 and a grid resistor 2 to the control-grid of a triode 3, connected as a grounded-plate amplifier, having a cathode resistor 4 included in the cathode circuit, which resistor is common to the input circuit and the output circuit of the grounded-plate amplifier 3. The low-frequency signal B is fed via a separation capacitor 5 and a grid resistor 6 to a grounded-plate amplifier of the same structure, which is formed by a triode 7, having a cathode resistor 8. Across the output circuits 4, 8 of the grounded-plate amplifiers 3, 7 occur the low-frequency signals A and B respectively; the sum signal $A+B$ of the low-frequency signals is obtained from the center tap 9 of a voltage divider 10, connected between the output circuits 4, 8 of the grounded-plate amplifiers 3, 7, which sum signal is derived for further operation in the stereophonic transmitter from the output terminals 11.

In order to form the difference signal $A-B$ of the stereophonic signals A and B, the device includes a third grounded-plate amplifier 12, having a cathode resistor 13, which is common to the input resistor and the output resistor of the grounded-plate amplifier 12; resistor 13 of this grounded-plate amplifier 12 is connected via a voltage divider 14 and 15 to the cathode resistor 4 and 8 respectively of the first and the second grounded-plate amplifiers 3 and 7 respectively, while the input voltage of this grounded-plate amplifier 12 is obtained from the output circuit of a voltage amplifier 16. The control-grid of the voltage amplifier 16 is connected via a separation capacitor 17 to a center tap 18 of the voltage divider 15, connected between the cathode resistors 8 and 13 of the grounded-plate amplifier 7, 12; from a center tap 19 of the voltage divider 14 connected between the cathode resistors 4, 13 of the grounded-plate amplifiers 3, 12, there is derived the difference signal $A-B$, which is obtained from output terminals 20 for further operation in the stereophonic transmitter. In this embodiment the voltage amplifier 16 is formed by a triode, which is provided with a grid resistor 21 and a parallel combination of a cathode resistor 22 and a smoothing capacitor 23 for the adjustment of the operating point of the triode 16 in the cathode circuit, whereas the amplified signals are obtained from an anode resistor 24, included in the anode circuit and connected to the control-grid of the grounded-plate amplifier 12 via the conductor 25.

In the device described above the voltage occurring at the tap 18 of the voltage divider 15 and determined by half the algebraic sum of the voltage B occurring across the cathode resistor 8 of the grounded-plate amplifier 7 and the voltage occurring across the cathode resistor 13 of the grounded-plate amplifier 12 is supplied in phase opposition, after voltage amplification by an amplification factor $g$, via the grounded-plate amplifier 12 to the cathode resistor 13. In this manner there is produced across the cathode resistor 13 of the grounded-plate amplifier 12 a voltage V, which is determined by the formula:

$$V=-\frac{g}{g+2}B \qquad (1)$$

With an adequate amplification factor $g$, for example 50, this voltage V will be completely independent of the properties of the voltage amplifier 16, substantially equal in amplitude but opposite in polarity to the voltage B, occurring across the cathode resistor 8 of the grounded-plate amplifier 7, so that, as stated above, the difference signal of the low-frequency signals A and B can be derived from the center tap 19 of the voltage divider 14, connected between the cathode resistors 4 and 13 of the grounded-plate amplifiers 3 and 12. With a suitable adjustment of the voltage dividers 10 and 14 the sum signal and the difference signal are obtained with great precision from the output terminals 11 and 12 for further operation in the stereophonic transmitter.

Thus not only an extreme independence from the properties of the voltage amplifier 16 is ensured, but also phase shifts in the sum and difference production of the low-frequency signals A and B are minimized by using identical grounded-plate amplifiers 3, 7, 12, each of which is loaded in the same manner. Moreover, in any further operations on the sum signal and the difference signal, phase shifts are substantially avoided owing to the accurate equality of the output impedances of the sum and difference producer, measured at the output terminals 11 and 20.

With the above-noted circuit, phase shifts are thus avoided up to very high frequencies; further phase shifts, if any, with very high frequencies, due to parasitic impedances, for example stray capacities of the amplifying tube 16, may be compensated in a simple manner by means of a small compensation capacitor 29, connected between the cathode of the grounded-plate amplifier 7 and the tapping 18 of the voltage divider 15.

In the further development of the device according to the invention the input circuit of the grounded-plate amplifier 12 is connected for direct currents to the output resistor 24 of the voltage amplifier 16, while the direct voltage occurring at the output resistor 24 is supplied via a smoothing filter consisting of a series resistor 26 and a smoothing capacitor 27 and via a conductor 28 to the grid resistors 2 and 6 of the grounded-plate amplifiers 3 and 7, so that an identical adjustment of the grounded-plate amplifiers 3, 7 and 12 is obtained. The voltage dividers 10, 14, 15 between the grounded-plate amplifiers 3, 7 and 12 are therefore not traversed by direct current so that there is no need for using separation capacitors, which might produce phase shifts, and a practical advantage is obtained in that crackling is avoided during the adjustment of the voltage dividers 10, 14 and 15.

The structure of the sum and difference producer is simple; the tubes 3, 7 and 12, 16 may be formed by tubes, while the corresponding component parts of the device described above may be chosen to be identical, for example the cathode resistors 4, 8, 13, the voltage dividers 10, 14, 15, the resistors 2, 6, 26 and the capacitors 1, 5. Moreover, the sum and difference producer is substantially insensitive to supply-voltage fluctuations and extremely independent of the properties of the tubes 3, 7, 12 and 16 employed and of the component parts, so that the circuit may be built up from cheap components, and it is also particularly simple to exchange the tubes and the parts.

The use of the measure according to the invention thus provides a sum and difference producer of which the embodiment and the properties are particularly attractive for practical purposes.

A few data of a practically tested device of the kind set forth are indicated below:

| | |
|---|---|
| Tubes 3, 7 and 12, 16 | Philips double triodes E80 CC. |
| Resistors 4, 8, 13 | 22K ohms. |
| Voltage dividers 10, 14, 15 | 20K ohms. |
| Resistors 2, 6, 26 | 470K ohms. |
| Capacitors 1, 5 | 0.1 $\mu$f. |
| Capacitor 27 | 1 $\mu$f. |
| Resistor 24 | 100K ohms. |
| Capacitor 17 | 0.47 $\mu$f. |
| Capacitor 29 | 6.8 $\mu\mu$f. |
| Resistor 22 | 2.2K ohms. |
| Capacitor 23 | 100 $\mu$f. |

FIG. 2 shows an embodiment of a sum and difference producer according to the invention using transistors, in which common-collector amplifiers are used instead of the grounded-plate amplifiers with tubes.

In the device described above the low-frequency signals A and B are fed via capacitors 30, 31 to the base electrodes of the common-collector amplifiers 32, 33, having emitter resistors 34, 35, which are common to the input resistor and the output resistors of the common-collector amplifiers 32, 33. These emitter resistors have thus produced across them the signals A and B, so that from a center tap 36 of a voltage divider 37, connected between the emitter resistors 34 and 35, there is derived the sum signal of the low-frequency signals A and B, which sum signal is obtained from output terminals 38.

In order to form the difference signal the device described comprises a third common-collector amplifier 39, having an emitter resistor 40, which is common to the input resistor and the output resistor of the common-collector amplifier 39; the input signal of the common-collector amplifier 39 is derived from an output resistor 46 of a transistor voltage amplifier 41 in common-emitter connection, of which the input circuit is connected via a conductor 42 and a separation capacitor 43 to a center tap 44 of a voltage divider 45, the latter being connected between the emitter resistor 40 and the emitter resistor 35 of the common-collector amplifiers 33, 39. In the embodiment shown the transistor amplifier 41 has, in common emitter connection, an emitter resistor 47 for the adjustment of the operating point and in order to stabilize the transistor 41 with respect to temperature fluctuations a stabilizing resistor 48 is connected between the collector electrode and the base electrode.

In the manner referred to in FIG. 1, the emitter resistor 40 of the common-collector amplifier 39 has produced across it a voltage which is equal in value and opposite in polarity and to the voltage B occurring across the emitter resistor 35 of the common-collector amplifier 33, so that the difference signal of the low-frequency signals A and B is derived from a center tap 49 of a voltage divider 50, connected between the emitter resistors 34, 40 of the transistors 32, 39, which signal is obtained from the output terminals 51 for further operation.

Similarly to the tube sum and difference producer it is ensured also with the transistorized sum and difference producer that phase shifts are minimized during the sum and difference production, while any residual phase shifts with very high frequencies, due to stray impedances are compensated by a small capacitor 52, connected between the emitter resistor 35 of the common-collector amplifier 33 and the central tapping 44 of the voltage divider 45.

In order to avoid the use of separation capacitors between the voltage dividers 37, 45, 49 and crackling during the adjustment of the voltage dividers 37, 45, 49, the operating point adjustment of the transistors 32, 33 is equal to that of the transistor 39, of which the base electrode is connected for direct currents to the collector resistor 46 of the transistor 41. This is achieved by connecting the base electrodes of the transistors 32 and 33 to a tapping of a voltage divider 54 and 55, 56, 57 respectively, connected between the negative voltage terminal 53 of the voltage supply source and earth.

As with the tube embodiment, the component parts may be chosen substantially identical, for example the emitter resistors 34, 35, 40, the voltage dividers 37, 45, 50, the resistors 54, 55, 56, 57 and the capacitors 30, 31; the sum and difference producer is also likewise substantially insensitive to fluctuations of the supply voltage and is extremely independent of the properties of the transistors and parts employed.

As stated above, the properties and the advantages of the sum and difference producer described with the transistor equipment are completely similar to those of the tube equipment.

A tested transistorized embodiment included the following components:

| | | |
|---|---|---|
| Transistors 32, 33, 39, 41 | | OC 45 |
| Resistors 34, 35, 40 | ohms | 10K |
| Voltage dividers 37, 45, 50 | do | 20K |
| Capacitors 30, 31 | $\mu$f | 10 |
| Capacitor 43 | $\mu$f | 10 |
| Resistors 54, 55, 56, 57 | ohms | 10K |
| Resistor 46 | do | 10K |
| Resistor 47 | do | 470 |
| Resistor 48 | do | 560K |
| Capacitor 52 | $\mu\mu$f | 22 |

It should, of course, be understood that the quantitative data are given for illustrative purposes only and are not meant to limit the invention, the scope of which is set forth in the appended claims.

What is claimed is:

1. A sum and difference producer for two low-frequency signals A and B, comprising:

a first follower amplifier,
a second follower amplifier,
the signals A and B being fed to the inputs of said first and second followers respectively,
a first voltage divider having a center tap and being connected between the output circuits of said first and second followers,
the sum signal $A+B$ being taken from said center tap,
a third follower amplifier,
second and third voltage dividers each having a center tap and being connected from the output circuits of said third to said first and second followers respectively, means for applying a signal from the center tap of one of said second and third dividers to the input circuit of said third follower,
the difference signal $A-B$ being taken from the center tap of the other of said second and third dividers.

2. A sum and difference producer for two low-frequency signals A and B, comprising:

a first follower amplifier,
a second follower amplifier,
the signals A and B being fed to the inputs of said first and second followers repectively,
a first voltage divider having a center tap and being connected between the output circuits of said first and second followers,
the sum signal A+B being taken from said center tap,
a third follower amplifier,
second and third voltage dividers each having a center tap and being connected from the output circuits of said third to said first and second followers respectively,
a signal amplifier having its input connected to the center tap of one of said second and third dividers, and its output connected to the input circuit of said third follower,
the difference signal $A-B$ being taken from the center tap of the other of said second and third dividers.

3. The arrangement of claim 2, further comprising a compensation capacitor coupled between the center tap of the voltage divider connected to the input of the signal amplifier and the output circuit of said third follower amplifier.

4. A sum and difference producer as claimed in claim 2, wherein each amplifier is a tube and the output of the signal amplifier is direct current conductively connected to the control grid of the third follower amplifier and the grid resistors of the first and second follower amplifiers are coupled to the anode resistor of the signal amplifier.

5. A sum and difference producer as claimed in claim 2, wherein each amplifier is a transistor and the signal amplifier is connected in common-emitter configuration with its output circuit being direct current conductively connected to the base electrode of the third follower amplifier, further including means for stabilizing the base bias voltages of each of the follower amplifiers comprising fourth and fifth voltage dividers connected between the supply voltage terminals and the base electrodes of the first and second follower amplifiers respectively.

6. The arrangement of claim 3, wherein each amplifier is a tube and the output of the signal amplifier is direct current conductively connected to the control grid of the third follower amplifier and the grid resistors of the first and second follower amplifiers are coupled to the anode resistor of the signal amplifier.

7. A sum and difference producer as claimed in claim 3, wherein each amplifier is a transistor and the signal amplifier is connected in common-emitter configuration with its output circuit being direct current conductively connected to the base electrode of the third follower amplifier, further including means for stabilizing the base bias voltages of each of the follower amplifiers comprising fourth and fifth voltage dividers connected between the supply voltage terminals and the base electrodes of the first and second follower amplifiers respectively.

References Cited in the file of this patent

UNITED STATES PATENTS

| | | |
|---|---|---|
| 2,432,826 | Smith | Dec. 16, 1947 |
| 2,705,265 | Hall | Mar. 29, 1955 |
| 2,779,872 | Patterson | Jan. 29, 1957 |
| 2,903,524 | Howell | Sept. 8, 1959 |